US011048003B2

(12) United States Patent
Lindberg

(10) Patent No.: US 11,048,003 B2
(45) Date of Patent: Jun. 29, 2021

(54) BRIDLE BITE ADJUSTMENT

(71) Applicant: PGS Geophysical AS, Oslo (NO)

(72) Inventor: Daniel Lindberg, Oslo (NO)

(73) Assignee: PGS GEOPHYSICAL AS, Oslo (NO)

( * ) Notice: Subject to any disclaimer, the term of this patent is extended or adjusted under 35 U.S.C. 154(b) by 0 days.

(21) Appl. No.: 16/714,926

(22) Filed: Dec. 16, 2019

(65) Prior Publication Data

US 2020/0191986 A1 Jun. 18, 2020

Related U.S. Application Data

(60) Provisional application No. 62/797,671, filed on Jan. 28, 2019, provisional application No. 62/781,102, filed on Dec. 18, 2018.

(51) Int. Cl.
| | |
|---|---|
| *G01V 1/38* | (2006.01) |
| *B63B 21/16* | (2006.01) |
| *B63B 21/20* | (2006.01) |
| *B63B 21/66* | (2006.01) |
| *B66D 1/52* | (2006.01) |

(52) U.S. Cl.
CPC ............ *G01V 1/3826* (2013.01); *B63B 21/16* (2013.01); *B63B 21/20* (2013.01); *B63B 21/66* (2013.01); *B66D 1/52* (2013.01); *B63B 2211/02* (2013.01)

(58) Field of Classification Search
CPC ......... B63B 21/00; B63B 21/16; B63B 21/20; B63B 21/56; B63B 21/66; B66D 1/00; B66D 1/52; G01V 1/3808; G01V 1/3826; G01V 1/38

USPC ...... 114/244, 247, 253, 254; 367/15, 16, 20, 367/21
See application file for complete search history.

(56) References Cited

U.S. PATENT DOCUMENTS

| | | | |
|---|---|---|---|
| 5,444,933 A | 8/1995 | Kinoshita et al. | |
| 7,404,370 B2 * | 7/2008 | Stokkeland | G01V 1/3826 114/244 |
| 8,267,031 B2 * | 9/2012 | Austad | G01V 1/38 114/244 |
| 8,335,126 B2 * | 12/2012 | Sudow | G01V 1/3835 367/19 |
| 8,619,496 B2 * | 12/2013 | Hartland | G01V 1/38 367/15 |
| 9,581,714 B2 | 2/2017 | Barral et al. | |
| 10,054,705 B2 | 8/2018 | Hillesund et al. | |
| 10,114,136 B2 | 10/2018 | Boberg | |
| 2008/0029012 A1 | 2/2008 | Stokkeland | |

(Continued)

FOREIGN PATENT DOCUMENTS

WO 2011135006 11/2011

OTHER PUBLICATIONS

Extended European Search Report for related EP Application 19217410.0, dated May 18, 2020 (9 pgs).

*Primary Examiner* — Lars A Olson

(57) ABSTRACT

A system for bridle bite adjustment can include a tow rope coupled to a paravane at a first position on a lever arm and a spur line coupled to the paravane at a second position on the lever arm. The system can also include a winch to adjust a deployed length of the tow rope. The tow rope and the lever arm can adjust a bridle bite of the paravane by when the deployed length of the tow rope is adjusted by the winch, thereby balancing tension between the tow rope and the spur line.

20 Claims, 7 Drawing Sheets

(56) References Cited

U.S. PATENT DOCUMENTS

| | | | |
|---|---|---|---|
| 2013/0010570 A1* | 1/2013 | Sudow | G01V 1/3826 |
| | | | 367/16 |
| 2014/0104985 A1 | 4/2014 | Gagliardi et al. | |
| 2015/0117716 A1* | 4/2015 | Ursin | G01V 1/3835 |
| | | | 382/106 |
| 2019/0377348 A1 | 12/2019 | Lambert | |

* cited by examiner

BRIDLE BITE ADJUSTMENT

CROSS-REFERENCE TO RELATED APPLICATIONS

This application claims priority to U.S. Provisional Applications 62/781,102 filed Dec. 18, 2018 and 62/797,671 filed Jan. 28, 2019, which are hereby incorporated by reference as if entirely set forth herein.

BACKGROUND

In the past few decades, the petroleum industry has invested heavily in the development of marine survey techniques that yield knowledge of subterranean formations beneath a body of water in order to find and extract valuable resources, such as oil. High-resolution images of a subterranean formation are helpful for quantitative interpretation and improved reservoir monitoring. For a typical marine survey, a marine survey vessel tows one or more marine survey sources (hereinafter referred to as "sources") below the sea surface and over a subterranean formation to be surveyed for mineral deposits. Marine survey receivers (hereinafter referred to as "receivers") may be located on or near the seafloor, on one or more streamers towed by the marine survey vessel, or on one or more streamers towed by another vessel. The marine survey vessel typically contains marine survey equipment, such as navigation control, source control, receiver control, and recording equipment. The source control may cause the one or more marine survey sources, which can be impulsive sources such as air guns, non-impulsive sources such as marine vibrator sources, electromagnetic sources, etc., to produce signals at selected times. Each signal is essentially a wave that travels down through the water and into the subterranean formation. At each interface between different types of rock, a portion of the wave may be refracted, and another portion may be reflected, which may include some scattering, back toward the body of water to propagate toward the sea surface. The receivers thereby measure a wave that was initiated by the actuation of the marine survey source.

DETAILED DESCRIPTION

Figure 1:
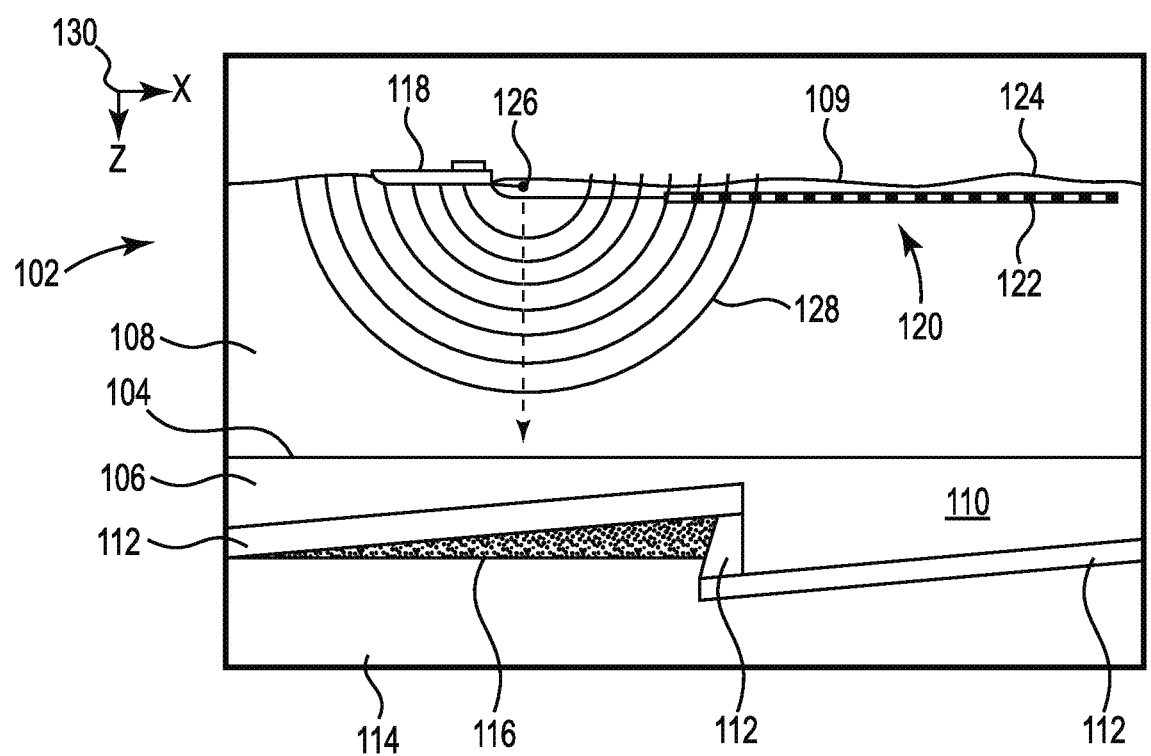
FIG. 1 is an elevation or xz-plane view of an example marine survey in which signals are emitted by a source for recording by receivers.

This disclosure is related generally to the field of marine surveying. Marine surveying can include, for example, seismic and/or electromagnetic surveying, among others. For example, this disclosure may have applications in marine surveying, in which one or more source elements are used to generate wavefields, and sensors (towed and/or ocean bottom) receive energy generated by the source elements and affected by the interaction with a subsurface formation. The sensors thereby collect survey data, which can be useful in the discovery and/or extraction of hydrocarbons from subsurface formations.

A paravane is a device towed through a fluid volume, such as an ocean or other body of water, to maintain equipment, including streamers, in a particular position relative to the marine survey vessel and one another. The force of water or other fluid on the paravane causes the paravane to sink or rise in the fluid volume, move sideways, or maintain a particular orientation. A paravane may be coupled to the marine survey vessel via a first line and to the streamers via a second line, with the first and the second line coupled to the paravane at a single point. Paravanes may also be referred to as doors or door deflectors.

The angle of the paravane relative to the marine survey vessel is referred to as a "bridle bite." The bridle bite is typically fixed and is determined before deployment of the paravane by the length of a bridle strap attached to the paravane. A tow rope can be coupled to a paravanes via a lever arm and through respective set of lines called a "bridle", with each line called a "bridle strap". The bridle bite may be adjusted by returning the paravane to the marine survey vessel and adjusting the bridle strap length manually. This is a time-consuming process that results in lost time collecting survey data. Adjustment may be desired at times, such as when the fluid volume or the speed of the marine survey vessel relative to the fluid volume is unstable, as streamer separation within a spread of streamers is unstable in such situations. For instance, the spread of streamers may collapse or expand based on the speed of a marine survey vessel relative to the fluid volume, for instance a water speed. If such a speed changes, balance between streamers in the spread of streamers changes. To address this, some paravanes use hydraulic steering or electric steering to adjust a bridle bite, but these systems are costly and can be inaccurate, unreliable, or inefficient. Such steering may also reduce turn radii for the marine survey vessel and spread of streamers as a whole or for the paravane.

In contrast, at least one embodiment of the present disclosure can increase and improve marine survey vessel performance by adjusting bridle bite on a paravane through tension balancing between a tow rope and a spur line coupled to the paravane via a lever arm. As used herein, tension balancing includes offsetting and/or distributing tensions of the tow rope and the spur line such that a desired bridle bite on the paravane is met. For instance, a tension change in the tow rope affects a tension in the spur line and vice versa. In some examples, tension balancing includes changing a tension ratio between the tow rope and the spur line.

In at least one embodiment, the adjustment is made dynamically based on outside influences such a marine survey vessel speed relative to the fluid volume to maintain consistency of a spread of streamers. The lever arm can be used as a dual-connection point for the tow rope and the spur line, in contrast to other approaches in which a marine survey vessel and a spread of streamers is coupled to a paravane at a single point. At least one embodiment of the present disclosure results in increased efficiency and stability of the spread of streamers and allows for changing spread of streamers characteristics by balancing the tension between the spur line and the tow rope by adjusting a deployed length of the tow rope. At least one embodiment of the present disclosure allows for increased marine vessel speeds due to arrangements of the spur line and the tow rope with respect to one another and because of the ability to adjust the bridle bite dynamically with speed changes, resulting in faster and increased data collection. The spread of streamers, as used herein, includes towed streamers and associated sources and receivers.

It is to be understood that the present disclosure is not limited to particular devices or methods, which may, of course, vary. It is also to be understood that the terminology used herein is for the purpose of describing particular embodiments only and is not intended to be limiting. As used herein, the singular forms "a", "an", and "the" include singular and plural referents unless the content clearly dictates otherwise. Furthermore, the word "may" is used throughout this application in a permissive sense (having the potential to, being able to), not in a mandatory sense (must). The term "include," and derivations thereof, mean "including, but not limited to." The term "coupled" means directly or indirectly connected.

The figures herein follow a numbering convention in which the first digit or digits correspond to the drawing figure number and the remaining digits identify an element or component in the drawing. Similar elements or components between different figures may be identified by the use of similar digits. For example, 118 may reference element "18" in FIG. 1, and a similar element may be referenced as 218 in FIG. 2. Multiple analogous elements within one figure may be referenced with a reference numeral followed by a hyphen and another numeral or a letter. For example, 220-1 may reference element 20-1 in FIG. 2 and 220-2 may reference element 20-2, which can be analogous to element 20-1. Such analogous elements may be generally referenced without the hyphen and extra numeral or letter. For example, elements 220-1 and 220-2 may be generally referenced as 220. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention and should not be taken in a limiting sense.

FIG. 1 is an elevation or xz-plane 130 view of a marine survey in which signals are emitted by a marine survey source 126 for recording by marine survey receivers 122. The recording can be used for processing and analysis in order to help characterize the structures and distributions of features and materials underlying the surface of the earth. For example, the recording can be used to estimate a physical property of a subsurface location, such as the presence of a reservoir that may contain hydrocarbons. FIG. 1 shows a domain volume 102 of the earth's surface comprising a subsurface volume 106 of sediment and rock below the surface 104 of the earth that, in turn, underlies a fluid volume 108 of water having a sea surface 109 such as in an ocean, an inlet or bay, or a large freshwater lake. The domain volume 102 shown in FIG. 1 represents an example experimental domain for a class of marine surveys. FIG. 1 illustrates a first sediment layer 110, an uplifted rock layer 112, underlying rock layer 114, and hydrocarbon-saturated layer 116. One or more elements of the subsurface volume 106, such as the first sediment layer 110 and the uplifted rock layer 112, can be an overburden for the hydrocarbon-saturated layer 116. In some instances, the overburden may include salt.

FIG. 1 shows an example of a marine survey vessel 118 equipped to carry out marine surveys. In particular, the marine survey vessel 118 can tow one or more streamers 120 (shown as one streamer for ease of illustration) generally located below the sea surface 109. The streamers 120 can be long cables containing power and data-transmission lines (e.g., electrical, optical fiber, etc.) to which marine survey receivers may be coupled. In one type of marine survey, each marine survey receiver, such as marine survey receiver 122, comprises an electromagnetic receiver that detects electromagnetic energy within the water. Other marine surveys include receivers such as hydrophones or accelerometers. The streamers 120 and the marine survey vessel 118 can include sensing electronics and data-processing facilities that allow marine survey receiver readings to be correlated with absolute positions on the sea surface and absolute three-dimensional positions with respect to a three-dimensional coordinate system. In FIG. 1, the marine survey receivers along the streamers are shown to lie below the sea surface 109, with the marine survey receiver positions correlated with overlying surface positions, such as a surface position 124 correlated with the position of marine survey receiver 122. The marine survey vessel 118 can include a controller, which can be used for operations associated with bridle bite adjustment as described herein.

The marine survey vessel 118 can tow one or more marine survey sources 126 that produce signals as the marine survey vessel 118 and streamers 120 move across the sea surface 109. The marine survey sources 126 can include a plurality of sources producing signals (e.g., providing energy), for instance, impulsive sources such as air guns, non-impulsive sources such as marine vibrator sources, electromagnetic sources, etc., above, below, or in-line with the streamer 120. Marine survey sources 126 and/or streamers 120 may also be towed by other vessels or may be otherwise disposed in fluid volume 108. For example, marine survey receivers may be located on ocean bottom cables or nodes fixed at or near the surface 104, and marine survey sources 126 may also be disposed in a nearly-fixed or fixed configuration. For the sake of efficiency, illustrations and descriptions herein show marine survey receivers located on streamers, but it should be understood that references to marine survey receivers located on a "streamer" or "cable" should be read to refer equally to marine survey receivers located on a towed streamer, an ocean bottom receiver cable, and/or an array of nodes.

FIG. 1 shows acoustic energy illustrated as an expanding, spherical signal, illustrated as semicircles of increasing radius centered at the marine survey source 126, representing a down-going wavefield 128, following a signal emitted by the marine survey source 126. The down-going wavefield 128 is, in effect, shown in a vertical plane cross section in FIG. 1. The outward and downward expanding down-going wavefield 128 may eventually reach the surface 104, at which point the outward and downward expanding down-going wavefield 128 may partially scatter, may partially reflect back toward the streamers 120, and may partially refract downward into the subsurface volume 106, becoming elastic signals within the subsurface volume 106.

Although FIG. 1 illustrates that a marine survey vessel 118 is towing a streamer 120 with a number of receivers, embodiments are not so limited and can include the use of receivers that are fixed or releasably adhered to a bottom of the fluid volume, such as a nodal system or an ocean bottom cable (OBC) system as described herein or a nodal system. An OBC system can include, for instance, receivers spaced along the OBC, and data can be recorded by the receivers along the OBC for later retrieval and processing. In some at least one embodiment, both streamers and OBCs can be used to record data to be processed according to the present disclosure.

Figure 2:
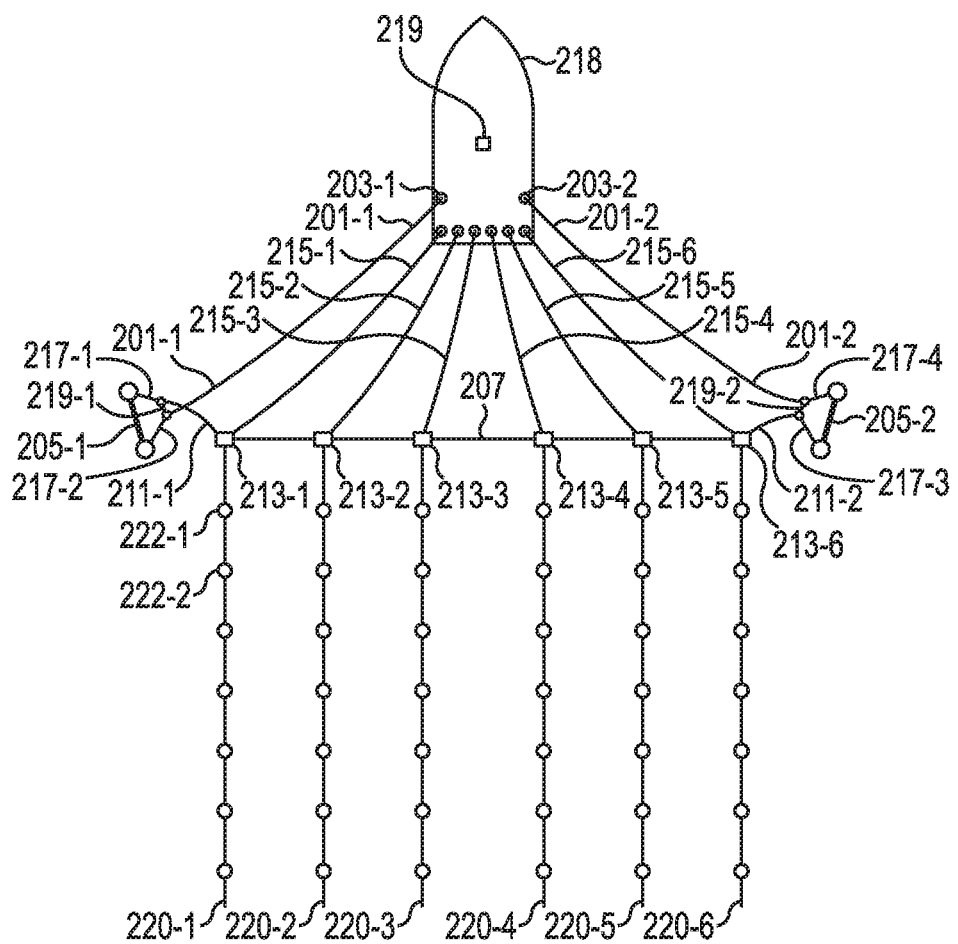
FIG. 2 is an overhead view of an example of a system for bridle bite adjustment.

FIG. 2 is an overhead view of an example of a system for bridle bite adjustment. FIG. 2 illustrates a marine survey vessel 218 having onboard equipment, such as navigation, source control, and data recording equipment. The onboard equipment can include a controller 219 for controlling functions of components, although in at least one embodiment, some components can have their own electronic control units located on the component itself. For embodiments in which the controller 219 is on the onboard equipment or on both the onboard equipment and on the system component, control can be provided between the marine survey vessel 218 and the system component in a wired or wireless fashion.

The marine survey vessel 218 is configured to tow one or more towed objects. Towed objects are generally illustrated herein as streamers, however embodiments are not so limited, as the towed objects can be sources, receivers, or other objects towed by the marine survey vessel 218. The marine survey vessel 218 can be configured to tow towed objects 220-1, 220-2, 220-3, 220-4, 220-5, and 220-6 through a fluid volume. While FIG. 2 shows six towed objects 220, embodiments are not so limited, and any number of towed objects may be used. The towed objects 220 can be coupled to towing equipment that maintains the towed objects 220 at selected positions, including depth and lateral positions, with respect to each other and with respect to the marine survey vessel 218. For example, the towing equipment can comprise a first tow rope 201-1 coupled to the marine survey vessel 218 by way of a first winch 203-1, such as an onboard winch, and a second tow rope 201-2 coupled to the marine survey vessel 218 by way of a second winch 203-2. The winches 203 enable adjusting the deployed length of each tow rope 201. The second end of a first tow rope 201-1 can be coupled to a first paravane 205-1, and the second end of a second tow rope 201-2 can be coupled to second paravane 205-2. In each case, the tow ropes 201 can be coupled to their respective paravanes 205 via a lever arm 219 and through respective set of lines called a "bridle", with each line called a bridle strap 217-1, 217-2, 217-3, 217-4. The lever arm 219 is a rigid object having two ends that serve as attachment points. In some examples, the lever arm 219 is a two-part object and/or a non-rigid object. The tow rope 201 is attached to one of the two ends, and the spur line 211 is attached to the other end. The paravanes 205 are each configured to provide a lateral force component to the various components of the marine survey system 200 when the paravanes 205 are towed in the water. The combined lateral forces of the paravanes 205 separate the paravanes 205 from each other constrained by one or more spreader lines 207 coupled between the paravanes 205. The paravanes 205 can be coupled directly to the spreader line 207, or as illustrated, coupled to the spreader line 207 by way of a first spur line 211-1 and a second spur line 211-2. For instance, as used herein, the paravanes 205 can be provided on the sides of a marine survey system to maintain a transverse distance (relative to the path of the marine survey vessel 218) between towed objects 220. The paravane 205 can be coupled to the marine survey vessel 218 via lines or cables, such as tow ropes 201, and a same or different type of lines or cables, such as spreader line 207, can be used to separate the towed objects 220 from one another.

In at least one embodiment, the winches 203 adjust bridle bites of the paravanes 205 by balancing tension between their respective tow ropes 201 and spur lines 211. For instance, the tow ropes 201 and the lever arms 219 adjust the bridle bites responsive to adjustment by the winches 203 of a deployed length of the tow ropes 201 from the marine survey vessel 218. By adjusting the deployed length of the tow ropes 201, the tensions on the spur lines 211 are adjusted. In at least one embodiment, a bridle bite of the paravane 205-2 is lowered by adjusting the deployed length of the tow rope 201-2 such that tension on the tow rope 201-2 is increased. Alternatively, in at least one embodiment, a bridle bite of the paravane 205-2 is raised by adjusting the deployed length of the tow rope 201-2 such that tension on the tow rope 201-2 is decreased. A bridle bite of the paravane 205-1 is raised by adjusting the deployed length of the tow rope 201-1 such that tension on the tow rope 201-1 is increased. As used herein, raising the bridle bite includes increasing the bridle bite such that the angle of the paravane relative to the marine survey vessel is increased. Alternatively, a bridle bite of the paravane 205-1 is lowered by adjusting the deployed length of the tow rope 201-1 such that tension on the tow rope 201-1 is lowered. As used herein, lowering the bridle bite includes reducing the bridle bite such that the angle of the paravane relative to the marine survey vessel is decreased. In at least one embodiment, the bridle bite adjustments and tension balancing are dependent on positioning of coupling of the tow ropes 201 and spur lines 211 to the lever arms 219, as will be discussed further herein. A single bridle bite of a single paravane may be adjusted at one time or multiple bridle bites of multiple paravanes may be adjusted at one time. While two different paravane arrangements are illustrated in FIG. 2, the paravane arrangements may be the same in at least one embodiment. For instance, both paravane arrangements may be the arrangement illustrated with respect to the paravane 205-1.

The towed objects 220 can each be coupled, at the ends nearest the marine survey vessel 218 (i.e., the proximal ends), to a respective lead-in termination 213-1, 213-2, 213-3, 213-4, 213-5, and 213-6. The lead-in terminations 213 can be coupled to or are associated with the spreader lines 207 so as to control the lateral positions of the towed objects 220 with respect to each other and with respect to the marine survey vessel 218. Electrical or optical connections between the appropriate components in the onboard equipment and the receivers, such as receivers 222-1 and 222-2 in the towed objects 220 may be made using lead-ins 215-1, 215-2, 215-3, 215-4, 215-5, and 215-6. Much like the tow ropes 201 associated with respective winch 203, each of the lead-ins 215 may be deployed by a respective winch such that the deployed length of each lead-in 215 can be changed. As used herein, a lead-in can be a cable or line that couples a streamer to a marine survey vessel. Although not illustrated in FIG. 2 due to perspective, each towed object 220 can be coupled to one or more front floats.

Figure 3:
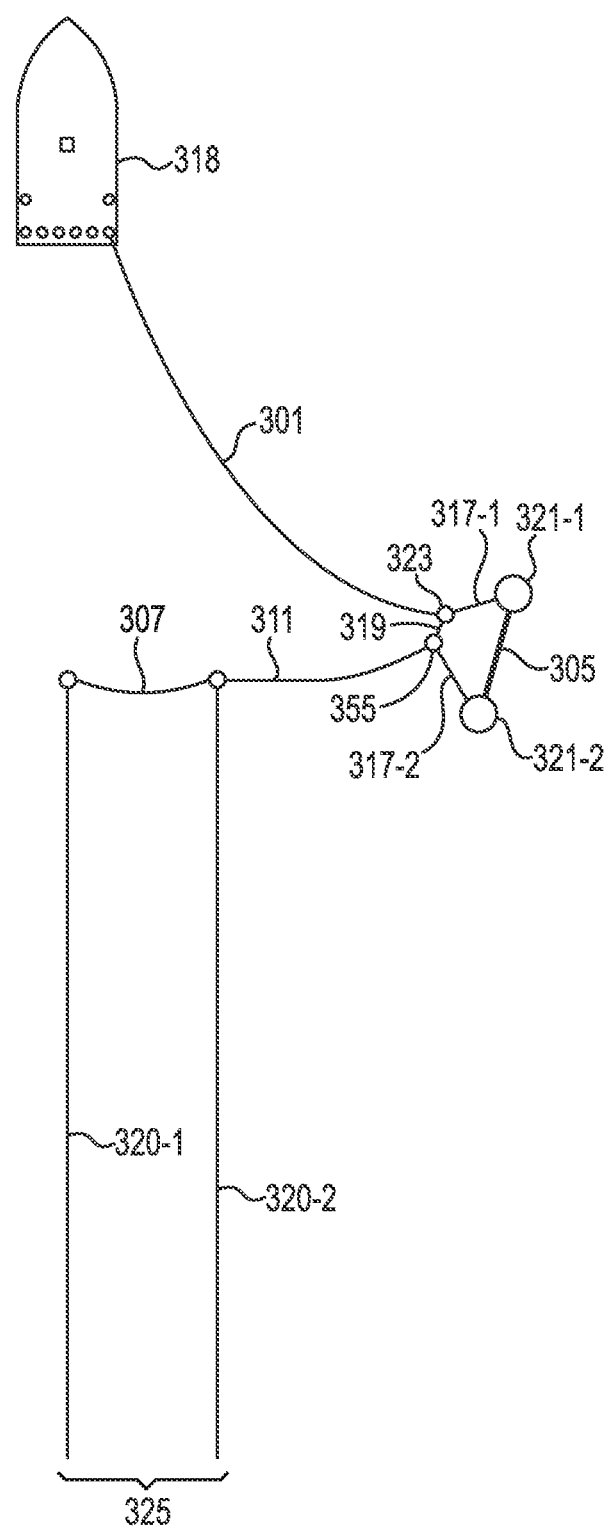
FIG. 3 is an overhead view of a portion of an example of a system for bridle bite adjustment.

FIG. 3 is an overhead view of a portion of an example of a system for bridle bite adjustment. In at least one embodiment, a marine survey vessel 318 tows a spread of streamers 325 including streamers 320-1 and 320-2 using a tow rope 301 and a spur line 311. The example illustrated in FIG. 3 is a portion of the system and the spread of streamers 325 and does not illustrate the entire spread of streamers or system. For instance, another paravane may be present elsewhere in the system, and more or fewer streamers 320 may be present in the spread of streamers 325. Additional elements, such as those illustrated in FIGS. 1 and 2 may also be present in the system or the spread of streamers 325. For instance, a direct connection (e.g., the lead-in line 215 in FIG. 2) between the marine survey vessel 318 and the spread of streamers 325 may be present.

The tow rope 301 is coupled to a first position (e.g., end) 323 on a lever arm 319, and the first end 323 of the lever arm 319 is also coupled to a first position (e.g., end) 321-1 on the paravane 305 via a bridle strap 317-1. A second end 321-2 of the paravane 305 is coupled to a second end 355 of the lever arm 319 via a bridle strap 317-2, and the second end 355 of the lever arm is also coupled to the spread of streamers 325 via a spur line 311. In the example illustrated in FIG. 3, the tow rope 301 is coupled to the lever arm 319 and the paravane 305 (e.g., via the lever arm 319) at points proximal to the marine survey vessel 318. For instance, the aforementioned tow rope coupling points include the first end 321-1 of the paravane 305 and the first end 323 of the lever arm 319, which are located proximal to the marine survey vessel 318. The spur line 311 is coupled to the lever arm 319 and the paravane 305 (e.g., via the lever arm 319), at points distal to the marine survey vessel 318. For example, the aforementioned spur line coupling points include the second end 321-2 of the paravane 305 and the second end 355 of the lever arm 319, which are located distal to the marine survey vessel 318.

In at least one embodiment, the tow rope 301 has a length that can be adjusted onboard the marine survey vessel 318 towing the spread of streamers 325. For instance, the tow rope 301 is payed out to increase its deployed length or retracted to shorten its deployed length via a winch. In at least one embodiment, the winch is an onboard winch used to pay out or retract the tow rope 301. As the tow rope 301 is payed out and its tension is lowered, the spur line 311 has a reduced tension resulting in a raised bridle bite on paravane 305. As the tow rope 301 is retracted and its tension increased, the spur line 311 also increases in tension resulting in a lowered bridle bite on paravane 305. For instance, the lever arm 319 can facilitate tension changes on the spur line 311, with the bridle straps 317 facilitating an adjusting a bridle bite on the paravane 305.

For instance, in an example in which the spread of streamers 325 is wider than desired, with the spur line 311 pulling too hard on the streamers 320, the tow rope 301 is retracted to lower the bridle bite on the paravane 305, which results in less tension on the spur line 311 and less pull on the streamers 320. This stabilizes the spread of streamers 325 to a desired spacing or maintains the same spacing with less force on the spreader line 307.

In at least one embodiment, the spur line 311 and the second bridle strap 317-2 can be coupled to each other or can be a unitary line that passes through or is otherwise coupled to an end 323 or 355 of the lever arm 319. It least one embodiment, the tow rope 301 and the first bridle strap 317-1 can be coupled to each other or can be a unitary line that passes through or is otherwise coupled to an end 323 or 355 of the lever arm 319.

Figure 4:
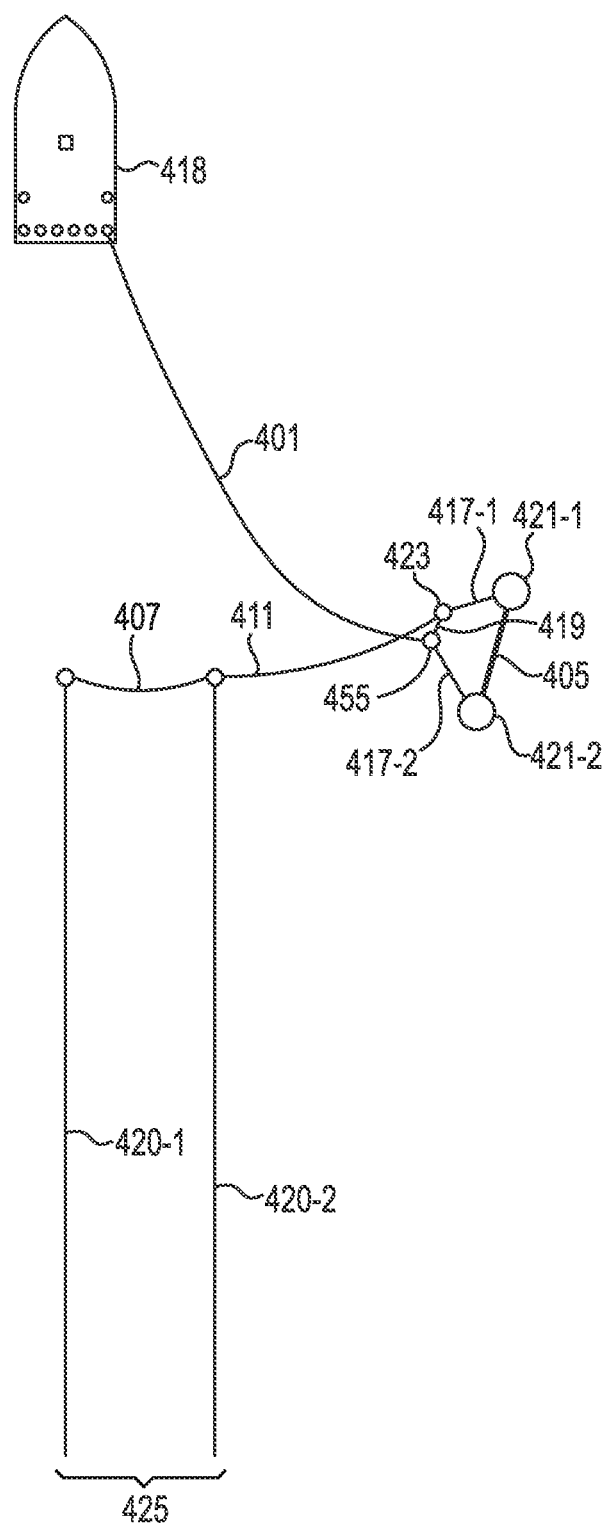
FIG. 4 is another overhead view of a portion of an example of a system for bridle bite adjustment.

FIG. 4 is another overhead view of a portion of an example of a system for bridle bite adjustment. In at least one embodiment, a marine survey vessel 418 tows a spread of streamers 425 including streamers 420-1 and 420-2 using a tow rope 401 and a spur line 411. The tow rope 401 couples the paravane 405 to the marine survey vessel 418, while the spur line 411 couples the paravane 405 to the spread of streamers 425. The example illustrated in FIG. 4 is a portion of the system and spread of streamers 425 and does not illustrate the entire spread of streamers or system. For instance, another paravane may be present elsewhere in the system, and more or fewer streamers 420 may be present in the spread of streamers 425. Additional elements, such as those illustrated in FIGS. 1 and 2 may also be present in the system or the spread of streamers 425. For instance, a direct connection between the marine survey vessel 418 and the spread of streamers 425 may be present.

The spur line 411 is coupled to a first end 423 of a lever arm 419, and the first end 423 of the lever arm 419 is also coupled to a first end 421-1 of the paravane 405 via a bridle strap 417-1. The first end 423 of the lever arm is coupled to the spread of streamers 425 via the spur line 411, and a second end 421-2 of the paravane 405 is coupled to a second end 455 of the lever arm 419 via a bridle strap 417-2. The second end 455 of the lever arm is also coupled to the tow rope 401. In the example illustrated in FIG. 4, the tow rope 401 is coupled to the lever arm 419 and the paravane 405 (e.g., via the lever arm 419), at points distal to the marine survey vessel 418. For instance, the aforementioned tow rope coupling points include the second end 421-2 of the paravane 405 and the second end 455 of the lever arm 419, which are located distal to the marine survey vessel 418. The spur line 411 is coupled to the lever arm 419 and the paravane 405 (e.g., via the lever arm 419), at points proximal to the marine survey vessel 418. For instance, the aforementioned spur line coupling points include the first end 421-1 of the paravane 405 and the first end 423 of the lever arm 419, which are located proximal to the marine survey vessel 418.

In at least one embodiment, the arrangement illustrated in FIG. 4 provides a lower bridle bite when the marine survey vessel 418 is traveling at a high rate of speed as compared to the arrangement illustrated in FIG. 3 and may allow for a balanced spread of streamers 425 without dynamic tension adjustment. For instance, the arrangement illustrated in FIG. 4 may allow for a single adjustment until a desired streamer separation is met or a same spacing is maintained with a changed force on the spreader line 407. Because of the locations of the tow rope 401 and the spur line 411, the desired streamer separation may remain at various marine survey vessel speeds relative to the fluid volume. For instance, because of the crossing of the spur line 411 and the tow rope 401, changes in speed of the vessel 418 may have a smaller effect on the spread of streamers 425 as compared to the arrangement of FIG. 3 because of the tension distribution between the spur line 411 and the tow rope 401. At slower speeds, the paravane 405 moves towards the left of FIG. 4, with tension on the spur line 411 being greater than on the tow rope 401. As the speeds increase, the paravane 405 moves towards the right (or is at least urged to the right with greater force) of FIG. 4, with the tension on the tow rope 401 becoming greater than the tension on the spur line 411. However, because of the tension distribution created by the crossing of the tow rope 401 and the spur line 411, the spread of streamers 425 may not change as dramatically at the increased speeds as compared to the arrangement in FIG. 3 in which the movements to the left or right would occur at a faster pace.

In at least one embodiment, the tow rope 401 has a length that can be adjusted onboard the marine survey vessel 418 towing the spread of streamers 425. For instance, the tow rope 401 is payed out to increase its deployed length or retracted to shorten its deployed length via a winch. The winch, for instance, balances tension between the tow rope 401 and the spur line 411. In at least one embodiment, the winch is an onboard winch used to pay out or retract the tow rope 401. As the tow rope 401 is payed out and its tension decreased, the spur line 411 loses tension, and the bridle bite of the paravane 405 is raised. As the tow rope 401 is retracted and its tension increased, the spur line 411 gains tension, and the bridle bite of the paravane 405 is lowered. For instance, the lever arm 419 can facilitate tension changes on the spur line 411, and the bridle straps 417 can facilitate adjustment of a bridle bite on the paravane 405. In at least one embodiment, the lever arm 419 and the tow rope 401 dynamically adjust the bridle bite while the paravane 405 and the spread of streamers 425 are deployed in the fluid volume. For instance, the deployed length of the tow rope 401 is adjusted dynamically, thereby resulting in a dynamically adjusted bridle bite.

As used herein, dynamically can include variable and/or constantly changing in response to a particular influence. For instance, as the speed of the marine survey vessel 418 changes, (e.g., relative to the fluid volume), the weather conditions affecting the marine survey vessel 418 change, or the conditions of the fluid volume change, the bridle bite is dynamically adjusted via the winch. For example, when the marine survey vessel 418 moves slowly, a raised bridle bite may be desired to maintain a spread of streamers. As the speed of the marine survey vessel 418 increases, it may be desired to decrease the bridle bite to maintain the spread of streamers. Other influences may trigger dynamic adjustments of the bridle bite in at least one embodiment.

In at least one embodiment, the tow rope 401 and the second bridle strap 417-2 are coupled to each other or are a unitary line that passes through or is otherwise coupled to an end 423 or 455 of the lever arm 419. It least one embodiment, the spur line 411 and the first bridle strap 417-1 are coupled to each other or are a unitary line that passes through or is otherwise coupled to an end 423 or 455 of the lever arm 419.

Figure 5:
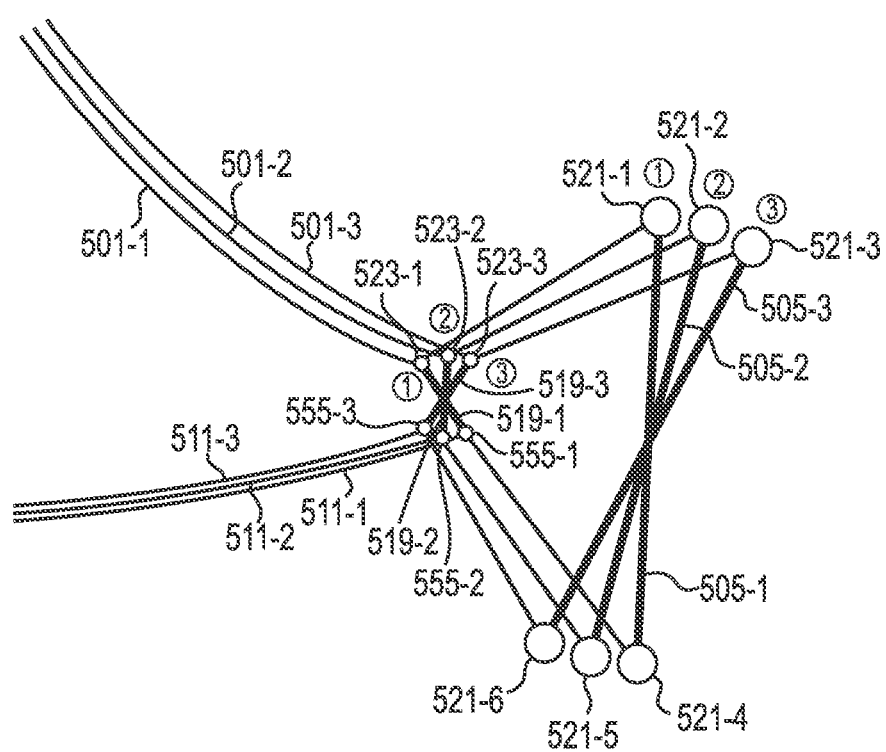
FIG. 5 is a diagram of examples of bridle bite adjustments.

FIG. 5 is a diagram of examples of bridle bite adjustments. While three example bridle bit adjustment scenarios are illustrated in FIG. 5, more adjustments may be possible. Scenarios 1, 2, and 3, as illustrated in FIG. 5, correspond to an example system for bridle bite adjustment as illustrated in FIG. 3. Scenario 1 includes the tow rope 501-1 coupled to a first end 523-1 of a lever arm 519-1. The first end 523-1 of the lever arm 519-1 is coupled to a first end 521-1 of a paravane 505-1. The first end 523-1 of the lever arm 519-1 and the first end 521-1 of the paravane 505-1 are proximal to a marine survey vessel towing a spread of streamers coupled to a spur line 511-1 and to a winch coupled to the tow rope 501-1. Spur line 511-1 is coupled to a second end 555-1 of the lever arm 519-1, which is coupled to a second end 521-4 of the paravane 505-1. The second end 555-1 of the lever arm 519-1 and the second end 521-4 of the paravane 505-1 are positioned distally from the marine survey vessel and the winch coupled to the tow rope 501-1. Scenario 1 illustrates when the tow rope 501-1 has the most tension, causing a lower bridle bite on the paravane 505-1. For instance, as a winch retracts a tow rope 501 (e.g., pulls to the left of FIG. 5) thereby increasing its tension, the first end 523 of the lever arm 519 is pulled to the left of FIG. 5 and thus pulls on the first end 521 of the paravane 505. This force is transferred to spur line 511. As a result, the angle of the paravane 505 is decreased, meaning the bridle bite of the paravane 505 is lowered.

Scenario 2 illustrates a balanced tension between the tow rope 501-2 and the spur line 511-2 resulting in a medium bridle bite on the paravane 505-2. Scenario 2 includes the tow rope 501-2 coupled to a first end 523-2 of a lever arm 519-2. The first end 523-2 of the lever arm 519-2 is coupled to a first end 521-2 of a paravane 505-2. The first end 523-2 of the lever arm 519-2 and the first end 521-2 of the paravane 505-2 are proximal to a marine survey vessel towing a spread of streamers coupled to a spur line 511-2 and to a winch coupled to the tow rope 501-2. Spur line 511-2 is coupled to a second end 555-2 of the lever arm 519-2, which is coupled to a second end 521-5 of the paravane 505-2. The second end 555-2 of the lever arm 519-2 and the second end 521-5 of the paravane 505-2 are positioned distally from the marine survey vessel and the winch coupled to the tow rope 501-2.

Scenario 3 illustrates when the spur line 511-3 has the most tension, resulting in a higher bridle bite on the paravane 505-3. Scenario 3 includes the tow rope 501-3 coupled to a first end 523-3 of a lever arm 519-3. The first end 523-3 of the lever arm 519-3 is coupled to a first end 521-3 of a paravane 505-3. The first end 523-3 of the lever arm 519-3 and the first end 521-3 of the paravane 505-3 are proximal to a marine survey vessel towing a spread of streamers coupled to a spur line 511-3 and to a winch coupled to the tow rope 501-3. Spur line 511-3 is coupled to a second end 555-3 of the lever arm 519-3, which is coupled to a second end 521-6 of the paravane 505-3. The second end 555-3 of the lever arm 519-3 and the second end 521-6 of the paravane 505-3 are positioned distally from the marine survey vessel and the winch coupled to the tow rope 501-3.

Figure 6:
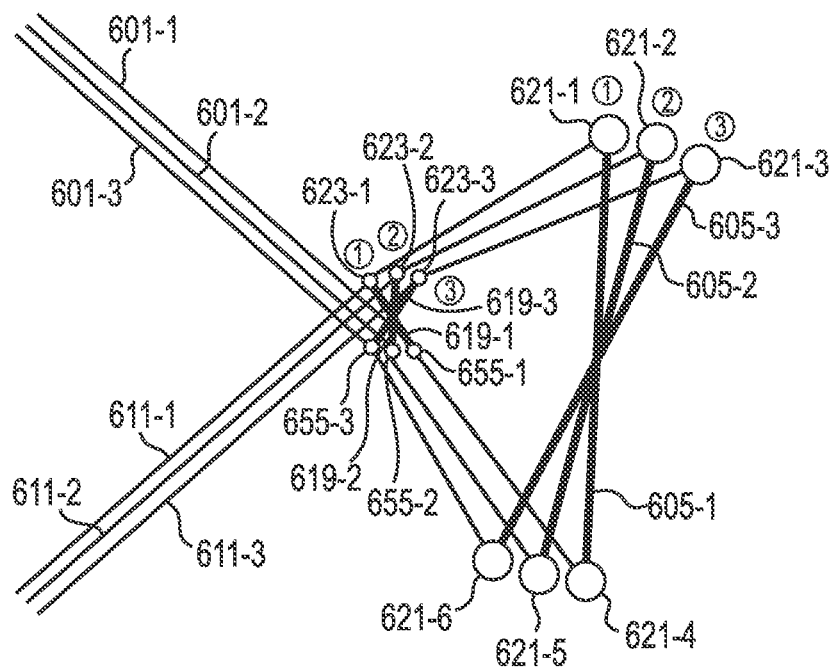
FIG. 6 is another diagram of examples of bridle bite adjustments.

FIG. 6 is another diagram of examples of bridle bite adjustments. While three example bridle bit adjustment scenarios are illustrated in FIG. 6, more adjustment scenarios may be possible. Scenarios 1, 2, and 3 as illustrated in FIG. 6 correspond to an example system for bridle bite adjustment as illustrated in FIG. 4. Scenario 1 includes the tow rope 601-1 coupled to a second end 655-1 of a lever arm 619-1. The second end 655-1 of the lever arm 619-1 is coupled to a second end 621-4 of a paravane 605-1. The second end 655-1 of the lever arm 619-1 and the second end 621-4 of the paravane 605-1 are distal to a marine survey vessel towing a spread of streamers coupled to a spur line 611-1 and to a winch coupled to the tow rope 601-1. Spur line 611-1 is coupled to a first end 623-1 of the lever arm 619-1, which is coupled to a first end 621-1 of the paravane 605-1. The first end 623-1 of the lever arm 619-1 and the first end 621-1 of the paravane 605-1 are positioned proximally from the marine survey vessel and the winch coupled to the tow rope 601-1. Scenario 1 illustrates when the tow rope 601-1 has the least tension, causing a lower bridle bite on the paravane 605-1. For instance, as tension is decreased in the tow rope 601-1, the second end 655-1 of the lever arm 619-1 moves to the right of FIG. 6, resulting in the second end 621-4 of the paravane 605 also moving to the right of FIG. 6, allowing for the first end 621-1 to move to the left of FIG. 6, reducing tension on the spur line 611.

Scenario 2 illustrates a balanced tension between the tow rope 601-2 and the spur line 611-2 resulting in a medium bridle bite on the paravane 605-2. Scenario 2 includes the tow rope 601-2 coupled to a second end 655-2 of a lever arm 619-2. The second end 655-2 of the lever arm 619-2 is coupled to a second end 621-5 of a paravane 605-2. The second end 655-2 of the lever arm 619-2 and the second end 621-5 of the paravane 605-2 are distal to a marine survey vessel towing a spread of streamers coupled to a spur line 611-2 and to a winch coupled to the tow rope 601-2. Spur line 611-2 is coupled to a first end 523-2 of the lever arm 619-2, which is coupled to a first end 621-2 of the paravane 605-2. The first end 623-2 of the lever arm 619-2 and the first end 621-2 of the paravane 605-2 are positioned proximally from the marine survey vessel and the winch coupled to the tow rope 601-2.

Scenario 3 illustrates when the spur line 611-3 has the most tension, resulting in a higher bridle bite on the paravane 605-3. Scenario 3 includes the tow rope 601-3 coupled to a second end 655-3 of a lever arm 619-3. The second end 655-3 of the lever arm 619-3 is coupled to a second end 621-6 of a paravane 605-3. The second end 655-3 of the lever arm 619-3 and the second end 621-6 of the paravane 605-3 are distal to a marine survey vessel towing a spread of streamers coupled to a spur line 611-3 and to a winch coupled to the tow rope 601-3. Spur line 611-3 is coupled to a first end 523-3 of the lever arm 619-3, which is coupled to a first end 621-3 of the paravane 605-3. The first end 623-3 of the lever arm 619-3 and the first end 621-3 of the paravane 605-3 are positioned proximally from the marine survey vessel and the winch coupled to the tow rope 601-3.

Figure 7:
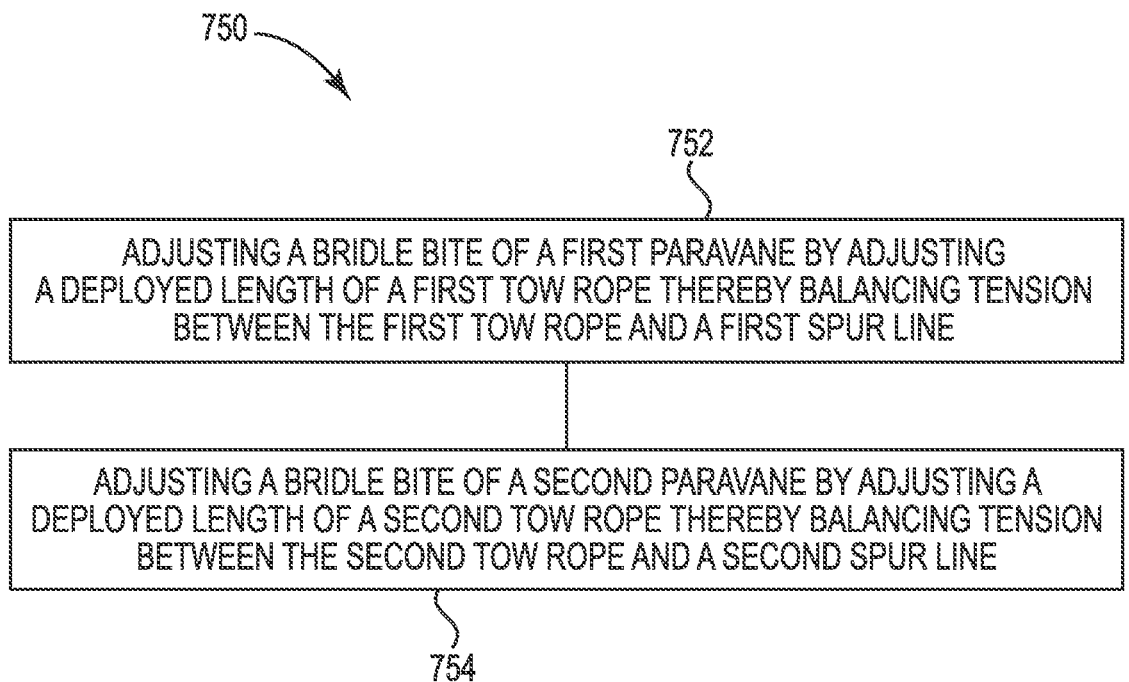
FIG. 7 is an exemplary method flow diagram for bridle bite adjustment.

FIG. 7 is an exemplary method flow diagram for bridle bite adjustment. At 752, the method 750 includes adjusting a bridle bite of a first paravane deployed in a fluid volume and towed by a marine survey vessel by adjusting a deployed length of a first tow rope coupled to a first end of a first lever arm to balance tension between the first tow rope and a first spur line coupled to a second end of the first lever arm. At 754, the method 750 includes adjusting a bridle bite of a second paravane deployed in the fluid volume and towed by the marine survey vessel by adjusting a deployed length of a second tow rope coupled to a first end of a second lever arm to balance tension between the second tow rope and a second spur line coupled to a second end of the second lever arm. For instance, adjusting the deployed length of a tow rope can include paying out or retracting the tow rope via a winch onboard the marine survey vessel.

The tow ropes and the spur lines can be coupled to the lever arms in different arrangements. For instance, in at least one embodiment, the first end of the first lever arm and the first end of the second lever arm are positioned proximal to the marine survey vessel and an onboard winch and the second end of the first lever arm and the second end of the second lever arm are positioned distal to the marine survey vessel and the onboard winch. In another embodiment, the second end of the first lever arm and the second end of the second lever arm are positioned proximal to the marine survey vessel and an onboard winch and the first end of the first lever arm and the first end of the second lever arm are positioned distal to the marine survey vessel and the onboard winch. The spur lines, in at least one embodiment, are coupled to a spread of streamers towed by the marine survey vessel. Adjusting the bridle bites of the paravanes in accordance with method 750, for example, allows for maintenance of substantially consistent streamer separation within the spread of streamers. As used herein, "substantially" means that a characteristic (e.g., consistent streamer separation) need not be absolute, but is close enough to the absolute characteristic so as to achieve the desired effects of the characteristic.

In at least one embodiment, adjustment of the bridle bite of a paravane includes decreasing tension on a tow rope to reduce tension on a spur line. Doing so results in a decreased bridle bite of the paravane if the end of the lever arm coupled to the tow rope is proximal to the marine survey vessel and a raised bridle bite of the paravane if the end of the lever arm coupled to the tow rope is distal to the marine survey vessel. Alternatively, increasing tension on the tow rope to reduce tension on the spur line raises the bridle bite of the paravane if the end of the lever arm coupled to the tow rope is proximal to the marine survey vessel and decreases the bridle bite of the paravane if the end of the lever arm coupled to the tow rope is distal to the marine survey vessel.

In at least one embodiment, bridle bite adjustments are made based on a speed of the marine survey vessel relative to the fluid volume. For instance, the deployed lengths of the tow ropes are adjusted based on a speed of the marine survey vessel relative to the fluid volume. One or more of the tow ropes can be payed out to increase the deployed length of the tow rope and decrease the tension on the tow rope, resulting in adjusted bridle bites. One or more of the tow ropes can be retracted to decrease the deployed length of the tow rope and increase its tension, resulting in adjusted bridle bites. The tow ropes may all be adjusted identically, may be adjusted differently, or one may be adjusted while another is not adjusted. In at least one embodiment, the adjustment of the tow rope deployed lengths adjusts tensions of bridle straps coupling the lever arm to the paravane, which aids in adjusting the bridle bite of the paravane.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A system, comprising:
   a spreader line configured to be coupled to one or more towable objects;
   a paravane;
   a lever arm coupled to the paravane and having first and second ends;
   a tow rope coupled to the lever arm at the first end;
   a spur line coupled to the lever arm at the second end and also coupled to the spreader line; and
   a winch coupled to the tow rope and configured to adjust a deployed length of the tow rope, wherein the tow rope and the lever arm are configured to adjust a bridle bite of the paravane when the deployed length of the tow rope is adjusted by the winch.

2. The system of claim 1, wherein the winch is configured to adjust the deployed length of the tow rope from a marine survey vessel.

3. The system of claim 1, wherein:
   the first end of the lever arm is positioned proximal to the winch, and the second end of the lever arm is positioned distal to the winch;
   the tow rope and the lever arm are configured to lower the bridle bite when the deployed length of the tow rope is adjusted by the winch to increase tension on the tow rope; and the tow rope and the lever arm are configured to raise the bridle bite when the deployed length of the tow rope is adjusted by the winch to decrease tension on the tow rope.

4. The system of claim 1, wherein:
the first end of the lever arm is positioned distal to the winch, and the second end of the lever arm is positioned proximal to the winch;
the tow rope and the lever arm are configured to raise the bridle bite when the deployed length of the tow rope is adjusted by the winch to increase tension on the tow rope; and
the tow rope and the lever arm are configured to lower the bridle bite when the deployed length of the tow rope is adjusted by the winch to decrease tension on the tow rope.

5. The system of claim 1, wherein:
the first end of the lever arm is coupled to the paravane via a bridle strap.

6. The system of claim 5, wherein:
the tow rope and the bridle strap comprise a unitary line that passes through the first end of the lever arm.

7. A method, comprising:
adjusting a bridle bite of a first paravane deployed in a fluid volume and towed by a marine survey vessel by adjusting a deployed length of a first tow rope coupled to a first end of a first lever arm thereby balancing tension between the first tow rope and a first spur line coupled to a second end of the first lever arm; and
adjusting a bridle bite of a second paravane deployed in the fluid volume and towed by the marine survey vessel by adjusting a deployed length of a second tow rope coupled to a first end of a second lever arm thereby balancing tension between the second tow rope and a second spur line coupled to a second end of the second lever arm,
wherein the first spur line and the second spur line are coupled to a spread of streamers towed by the marine survey vessel.

8. The method of claim 7, wherein the first end of the first lever arm and the first end of the second lever arm are positioned proximal to the marine survey vessel and the second end of the first lever arm and the second end of the second lever arm are positioned distal to the marine survey vessel.

9. The method of claim 7, further comprising adjusting the deployed length of the first tow rope and the deployed length of the second tow rope based on a speed of the marine survey vessel relative to the fluid volume.

10. The method of claim 7, further comprising adjusting the bridle bite of the first paravane and the second paravane to maintain substantially consistent streamer separation within the spread of streamers.

11. The method of claim 7, wherein adjusting the bridle bite of the first paravane comprises decreasing tension on the first tow rope to create more tension on the first spur line and a lowered bridle bite of the first paravane.

12. The method of claim 7, wherein adjusting the bridle bite of the first paravane comprises increasing tension on the first tow rope to reduce tension on the first spur line and raise the bridle bite of the first paravane.

13. The method of claim 7, wherein adjusting the deployed length of the first tow rope comprises:
adjusting a tension of a first bridle strap coupling the first end of the first lever arm to the first paravane; and
adjusting a tension of a second bridle strap coupling the second end of the second lever arm to the paravane.

14. A system, comprising:
a paravane;
a lever arm comprising a first end and a second end, the first end coupled to the paravane by a tow rope and the second end coupled to the paravane by a spur line;
a spread of streamers coupled to the spur line; and
a winch coupled to the tow rope and configured to adjust a deployed length of the tow rope,
wherein the lever arm and the tow rope are configured to adjust a bridle bite of the paravane when the winch adjusts the deployed length of the tow rope, thereby changing a tension between the tow rope and the spur line; and
wherein streamer separation within the spread of streamers changes responsive to the adjusted bridle bite.

15. The system of claim 14, wherein:
the first end of the lever arm is positioned distal to the winch; and
the second end of the lever arm is positioned proximal to the winch.

16. The system of claim 14, wherein the tow rope and the lever arm are configured to adjust the bridle bite when tension on the tow rope is increased by the winch to create more tension on the spur line and a lowered bridle bite of the paravane.

17. The system of claim 14, wherein the tow rope and the lever arm are configured to adjust the bridle bite when tension on the tow rope is decreased by the winch to reduce tension on the spur line and raise the bridle bite of the paravane.

18. The system of claim 14, wherein:
the first end of the lever arm is coupled to a first end of the paravane by a first bridle strap; and
the second end of the lever arm is coupled to a second end of the paravane by a second bridle strap.

19. The system of claim 14, wherein the paravane is coupled to a marine survey vessel via the tow rope.

20. The system of claim 14, wherein the tow rope and the lever arm are configured to dynamically adjust the bridle bite while the paravane and the spread of streamers are deployed in a fluid volume.

* * * * *